Oct. 11, 1932.  H. E. HARTIG ET AL  1,881,543
FLUID METER
Filed Feb. 27, 1929
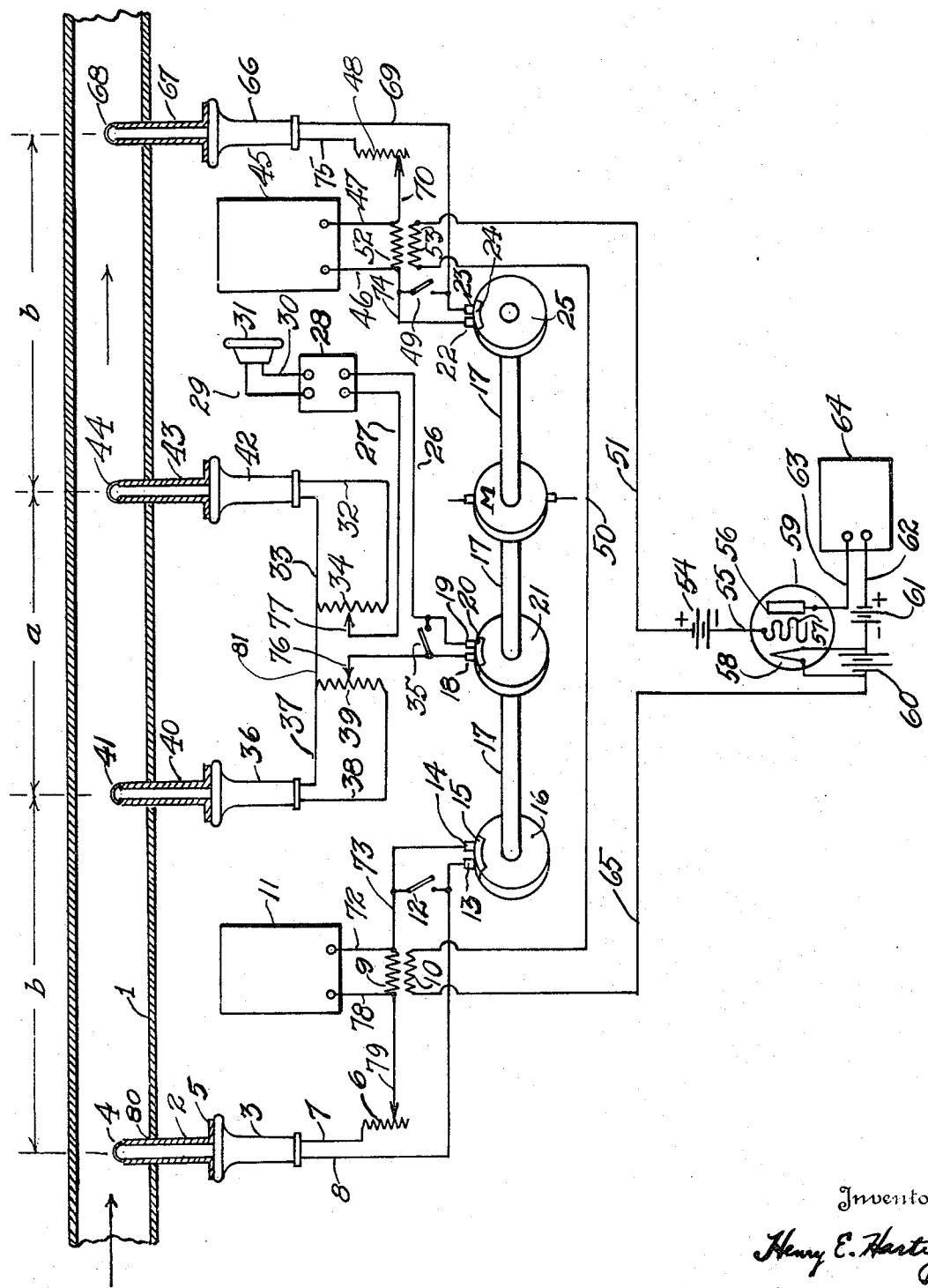
Inventor
Henry E. Hartig
Hugh B. Wilcox Patented Oct. 11, 1932

1,881,543

UNITED STATES PATENT OFFICE

HENRY E. HARTIG, OF CRYSTAL VILLAGE, AND HUGH B. WILCOX, OF MINNEAPOLIS, MINNESOTA

FLUID METER

Application filed February 27, 1929. Serial No. 343,115.

This invention relates to fluid meters. One of the objects of this invention is to provide a meter in which sonic effects are used for measuring the flow of fluids such as gas, oil, steam, air, water and the like, said measurements being effected by determining the effect of the velocity of the fluid upon the rate of propagation of sound waves in the fluid.

Another object of the invention is to provide a fluid meter which does not require calibration but which determines the velocity flow in terms of the physical dimensions of the meter and a measured frequency of a sound tone.

A further object of the invention is to provide a fluid meter which will measure very low fluid velocities as well as medium and high velocities with high accuracy.

A still further object of the invention is to provide a flow meter which will measure the velocity of a fluid which may or may not be confined or directed by a pipe or conduit. Thus, for example, the meter may be used to obtain the velocity of the wind.

Other objects and advantages of the invention will hereinafter appear.

The figure is a diagrammatic view of an embodiment of my invention.

Referring to the drawing, 1 designates a longitudinal section of a pipe or conduit through which flows the fluid whose velocity is to be measured; 2 designates a sound tube which is screwed or otherwise fastened into an opening 80 in conduit 1. Upon sound tube 2 is mounted a telephone receiver 3 on the flange 5. The end of the sound tube 2 is closed by a thin diaphragm 4 which will transmit sound but which is impervious to the fluid flowing in the conduit 1. The tube 2 may be left open if the fluid flowing in the conduit 1 is a gas at nearly atmospheric pressure. Similar sound tubes 40, 43 and 67 on which are fastened receivers 36, 42 and 66 respectively and which are closed by diaphragms 41, 44 and 68 are mounted on the conduit at distances $b$, $b+a$, and $2b+a$, respectively, from tube 2. A vacuum tube oscillator 11 is connected by conductors 78 and 72 with the primary 9 of a transformer whose secondary is indicated by 10. The primary 9 is connected in series with an adjustable resistance 6, sound emitting receiver 3, brushes 13 and 14 and a conducting segment 15 of the interrupter 16 by conductors 73, 79, 7 and 8. A switch 12 is bridged across conductors 73 and 8 so that the circuit may be closed whether or not the conducting segment 15 is connected to the brushes 13 and 14.

A second and independent vacuum tube oscillator 45 is connected to the primary 52 of a transformer by conductors 46 and 47. The secondary of this transformer is designated by 53. The primary 52 is connected in series with an adjustable resistance 48, a sound emitting receiver 66, brushes 23 and 22 and a conducting segment 24 of the interrupter 25, by conductors 70, 75, 69 and 74. A switch 49 is bridged across conductors 69 and 74. The interrupters 16, 21 and 25 are driven by the motor M through the shaft 17 either directly as shown or through suitable gearing to give the required speed of rotation. The sound detecting receiver 36 is connected by conductors 37 and 38 with the resistance 39. Similarly, the sound detecting receiver 42 is connected by conductors 32 and 33 with resistance 34. Conductors 33 and 37 are connected by conductor 81. Sliding conductors 76 and 77 contacting resistances 39 and 34 respectively are connected through brushes 18 and 19, segment 20 and conductors 26 and 27 to the input of the vacuum tube amplifier 28, the output of which is connected by conductors 29 and 30 to the telephone receiver 31. A switch 35 is bridged across conductors 26 and 76. The secondaries 10 and 53 are connected in series in a circuit with a biasing battery 54 by conductors 65, 50 and 51. One end of conductor 65 is connected to the filament 58 of a vacuum tube rectifier 59 and the negative side of the biasing battery 54 is connected by conductor 55 to the grid 57. Current for the filament is furnished by battery 60. A frequency meter 64 in series with a battery 61 is connected by conductors 62 and 63 between the plate 56 and filament 58 of the vacuum tube 59. The negative pole of the battery 61 is connected to the filament 58 of the vacuum tube 59.

The operation of the meter is as follows:— Let it first be supposed that reflected sound waves from the ends of the conduit are of no consequence or that their effect may be allowed for by suitable calculations. In this case switches 12, 35 and 49 are closed and the interrupters 16, 21 and 25 are not used. The vacuum tube oscillator 11 is then operated at a frequency such that the sound emitted by receiver 3 and transmitted through tube 2 and diaphragm 4 to the fluid flowing in conduit 1, reaches the diaphragms 41 and 44 in exact phase conjunction or opposition. By phase conjunction is meant that the diaphragms 41 and 44 are an integral number of wave lengths apart. By phase opposition is meant that the diaphragms 41 and 44 are an odd integral number of half wave lengths apart. Let it be assumed for simplicity that phase conjunction is selected. Then receivers 36 and 42 are affected in exactly the same manner and supposing the receivers 36 and 42 to be identical, the E. M. F. generated by each of them will be an alternating E. M. F. of the same frequency and identical in phase. The receivers are connected to resistances 34 and 39 in such a way that at every instant the current flowing through the resistance 34 is opposite in direction to that flowing through resistance 39. The terminals of conductors 76 and 77 are now brought to such a position on resistances 39 and 34 that no sound is heard in receiver 31. This condition of silence in receiver 31 is only possible (for the case now being considered) when the sound waves arriving at diaphragms 41 and 44 are in exact phase conjunction and it is therefore used to determine when this condition exists. If phase opposition is used, the terminals of either receiver 36 or 42 are reversed. Resistances 6 and 48 are used to increase or decrease the intensity of the sound emitted by receiver 3 or 66.

In exactly the same way and with oscillator 11 inoperative, oscillator 45 is operated at such a frequency that the sound wave train in conduit 1 originating at diaphragm 68 is in phase conjunction at diaphragms 44 and 41 and with the same integral number of wave lengths between diaphragms 44 and 41 as in the case when oscillator 11 was operated.

If the fluid in conduit 1 were at rest, the same integral number of wave lengths would exist between diaphragms 44 and 41 when the frequencies of oscillators 11 and 45 were equal. If, however, the fluid is in motion, the same number of integral wave lengths will only exist between diaphragms 44 and 41 when the frequency of oscillator 11 differs from that of 45, and this difference of frequency together with the dimensions of the meter may be used to determine the velocity of the fluid in the conduit 1.

This difference between the frequencies of oscillators 11 and 45 may be measured by various methods well known to the art. The operation of the type of apparatus shown in the figure to effect this measurement is as follows:—Let oscillators 11 and 45 be operated simultaneously with frequencies the same as were used in making the measurement as explained above. Current from oscillator 11 flowing through primary 9 induces an E. M. F. of the same frequency in the secondary 10 and likewise current from oscillator 45 induces an E. M. F. of corresponding frequency in the secondary 53. The sum of these two E. M. F.'s together with a constant biasing potential is impressed between the grid and filament of the vacuum tube rectifier 59. In consequence of the fluctuations of the grid potential, the current in the plate circuit 63, 62 rises and falls with a frequency equal to the difference of the frequencies of oscillators 11 and 45, said difference of frequency being measured by the frequency meter 64.

The number of integral wave lengths which exist between diaphragms 41 and 44 may be determined as follows: The frequency of oscillator 11 is adjusted until phase conjunction exists between diaphragms 41 and 44 as indicated by silence in receiver 31. The frequency is then increased to the next value at which phase conjunction again occurs. These two frequencies and the distance $a$ are related by a simple formula to the integral numbers of wave lengths existing between diaphragms 41 and 44. The same procedure is used with oscillator 45.

If reflections from the ends of the conduit or irregularities or obstructions therein interfere with the measurements as hereinbefore described, their effect may be eliminated as follows: Switches 12, 35, and 49 are opened as shown in the figure. With oscillator 45 inoperative and with oscillator 11 generating an alternating E. M. F. of definite frequency, the motor M rotates interrupters 16 and 21 at such a rate that the time during which segment 15 closes the circuit from oscillator 11 to receiver 3 is equal or less than the least time required for sound to travel from diaphragm 4 to a reflecting surface and back to either diaphragm 41 or 44.

The segment 15 is so adjusted with respect to segment 20 both as regards length of contact arc and angular disposition on the shaft 17 that the listening circuit which terminates at the receiver 31 is closed only during that interval of the time that no reflected waves are intercepted by diaphragms 41 and 44.

The necessary adjustment may be determined by calculation or made experimentally by shifting interrupter 16 with respect to 21 on shaft 17 and by separating or bringing closer together the brushes 13 and 14 along the length of the arc 15. A similar adjustment can be effected with regard to oscillator 45, interrupter 25 and receiver 66.

What we claim is:

1. The method of determining the rate of flow of fluids which method consists in setting up mechanical vibrations in the moving fluid adapted to be propagated in the direction of travel of the fluid and in a direction opposite thereto, in measuring the difference in effect of the fluid flow upon the rates of propagation of the vibrations in both such directions, and in ascertaining the rate of flow of the fluid from said difference.

2. The method of determining the rate of flow of fluids which method consists in setting up mechanical vibrations in the fluid in such a manner as to cause the flow of the fluid to increase the rate of propagation of said mechanical vibrations, in setting up other vibrations in the fluid under such conditions as not to increase the rate of propagation due to the flow of the fluid, in measuring the difference between the rates of propagation of said vibrations, and in ascertaining the rate of flow of the fluid from said difference.

3. The method of determining the rate of flow of fluids which method consists in setting up mechanical vibrations in the moving fluid in a manner to cause the same to be propagated in the direction of travel of the fluid, in setting up in the fluid other mechanical vibrations in a manner to cause the same to be propagated in the opposite direction, in adjusting the frequencies of said vibrations to equalize the wave-lengths of the vibrations in said two directions, in measuring the difference in frequency of said vibrations, and in ascertaining the velocity of flow of the fluid from such difference.

4. The method of determining the rate of flow of fluids which method consists in setting up mechanical vibrations in the moving fluid in a manner to cause the same to be propagated in the direction of travel of the fluid and past two given loci in the course of travel of the fluid, in varying the frequency of said vibrations to cause an integral number of half wave lengths of said vibrations to be included between said loci, in thereafter setting up other mechanical vibrations in the moving fluid in a manner to cause the same to be propagated in the opposite direction and past said same two loci, in varying the frequency of said latter vibrations to cause the same number of half wave-lengths to be included between said loci, in measuring the difference between said frequencies, and in ascertaining the rate of flow of the fluid from said difference and the distance between said loci.

5. The method of determining the rate of flow of fluids which method consists in setting up mechanical vibrations in the moving fluid adapted to be propagated in the direction of travel of the fluid, in setting up other mechanical vibrations in the fluid adapted to be propagated in the other direction, in measuring the difference in effect of the fluid flow upon the rate of propagation of the vibrations in both such directions, and in ascertaining the rate of flow of the fluid from said difference.

6. The method of determining the rate of flow of fluids in walled conduits which method consists in setting up mechanical vibrations in the moving fluid adapted to be propagated in the direction of travel of the fluid, in setting up other vibrations in the fluid adapted to be propagated in the other direction, in measuring the difference in effect of the fluid flow upon the rate of propagation of the vibrations in both such directions during intervals at which said rates of propagation remain unaffected by the reflection of the vibrations from irregularities of the conduit, and in ascertaining the rate of flow of the fluid from said difference.

7. A device for measuring the rate of flow of fluids comprising means for setting up mechanical vibrations in the fluid at one locus in the course of travel thereof, means for setting up other mechanical vibrations at another locus in the course of travel of the fluid and distanced from the first mentioned locus, members responsive to the vibrations in the fluid disposed at known spaced points between said loci, both of said means for setting up vibrations being adjustable to vary the frequency of said vibrations so as to cause a whole number of half wave lengths to be included between said points, means actuated by said members for determining the occurence of such condition, and means for measuring the difference in frequency of the vibrations.

8. A device for measuring the rate of flow of fluids comprising means for setting up mechanical vibrations in the fluid traveling both in the direction of flow of the fluid and in the opposite direction, and means for detecting the difference in effect of the rate of flow of the fluid upon the rate of propagation of the vibrations in the two directions.

9. A device for measuring the rate of flow of fluids comprising means for setting up independent mechanical vibrations in the fluid adapted to be propagated along the path of travel of the fluid and in opposite directions, said means being adjustable to vary the frequencies to equalize the wave lengths of said vibrations, and means for measuring the difference in frequencies of said vibrations.

10. A device for measuring the rate of flow of fluids comprising means for setting up independent mechanical vibrations in the fluid adapted to be propagated along the path of travel of the fluid and in opposite directions, said means being adjustable to vary the frequencies to equalize the wave lengths of said vibrations, means for detecting equalization of said wave lengths, and means for measuring the difference in frequencies of said vibrations.

11. A device for measuring the rate of flow of fluids comprising means for setting up independent mechanical vibrations in the fluid adapted to be propagated along the path of travel of the fluid and in opposite directions, said means being adjustable to vary the frequencies to equalize the wave lengths of said vibrations, means for measuring the difference in frequencies of said vibrations, and means for momentarily actuating said measuring means.

12. A device for measuring the rate of flow of fluids comprising means for setting up independent mechanical vibrations in the fluid adapted to be propagated along the path of travel of the fluid and in opposite directions, said means being adjustable to vary the frequencies to equalize the wave lengths of said vibrations, means for detecting equalization of said wave lengths, means for measuring the difference in frequencies of said vibrations, and means for momentarily actuating said measuring and detecting means.

13. A device for measuring the rate of flow of fluids comprising means for setting up independent mechanical vibrations in the fluid adapted to be propagated along the path of travel of the fluid and in opposite directions, said means being adjustable to vary the frequencies to equalize the wave lengths of said vibrations, means for comparing the wave lengths of both sets of vibrations, said vibration producing means being operable to alternately set up said vibrations, and means for measuring the difference in frequencies of said vibrations.

14. The method of determining the rate of flow of fluids which method consists in setting up mechanical vibrations in the moving fluid adapted to be propagated in the direction of travel of the fluid and in a direction opposite thereto and of comparable wave lengths, in measuring the difference in effect of the fluid flow upon the rates of propagation of the vibrations in both such directions and at places where the rate of flow is the same and in ascertaining the rate of flow of the fluid.

15. The method of determining the rate of flow of fluids which method consists in setting up mechanical vibrations in the fluid in such a manner as to cause the flow of the fluid to increase the rate of propagation of said vibrations, in setting up other mechanical vibrations in the fluid of wave length comparable with the first named vibrations and at a locality in which the rate of flow of the fluid is equal to the rate of flow of the fluid where the first named vibrations have been set up and such conditions as not to increase the rate of propagation due to the flow of the fluid, in measuring the difference between the rates of propagation of said vibrations at localities in which the rate of flow of the fluid is the same and in ascertaining the rate of flow of the fluid from said difference.

16. The method of determining the rate of flow of fluids which method consists in setting up mechanical vibrations in the moving fluid in a manner to cause the same to be propagated in the direction of travel of the fluid, in setting up in the fluid, other mechanical vibrations in a manner to cause the same to be propagated in the opposite direction, in adjusting the frequencies of said vibrations to equalize the wave lengths of the vibrations in said two directions, in measuring at the same locality the difference in frequency of said vibrations, and in ascertaining the velocity of flow of the fluid from such difference.

17. The method of determining the rate of flow of fluids which method consists in setting up mechanical vibrations in the moving fluid adapted to be propagated in the direction of travel of the fluid, in setting up other mechanical vibrations having a wave length comparable with that of said first named vibrations in the fluid, adapted to be propagated in the other direction, in measuring at the same locality the difference in effect of the fluid flow upon the rate of propagation of the vibrations in both such directions, and in ascertaining the rate of flow of the fluid from said difference.

18. The method of determining the rate of flow of fluids in walled conduits which method consists in setting up mechanical vibrations in the moving fluid adapted to be propagated in the direction of travel of the fluid, in setting up other vibrations in the fluid vibrations of a wave length comparable to the wave length of said first named vibrations and adapted to be propagated in the other direction, in measuring at localities where the rate of flow of the fluid is equal the difference in effect of the fluid flow upon the rate of propagation of the vibrations in both such directions during intervals at which said rates of propagation remain unaffected by the reflection of vibrations from irregularities of the conduit, and in ascertaining the rate of flow of the fluid from said difference.

19. A device for measuring the rate of flow of fluids comprising means for setting up mechanical vibrations in the fluid at one locus in the course of travel thereof, means for setting up other mechanical vibrations of the same wave length at another locus in the course of travel of the fluid and distanced from the first mentioned locus, members responsive to the vibrations in the fluid disposed at known spaced points between said loci, both of said means for setting up vibrations being adjustable to vary the frequency of said vibrations so as to cause a whole number of half wave lengths to be included between said points, means actuated by said members for determining the occurrence of such condition, and means for measuring the difference in frequency of the vibrations.

20. A device for measuring the rate of flow of fluids comprising means for setting up mechanical vibrations in the fluid traveling both in the direction of flow of the fluid and in the opposite direction and of the same wave length, and means for detecting at the same locality the difference in effect of the rate of flow of the fluid upon the rate of propagation of the vibrations in the two directions.

21. A device for measuring the rate of flow of fluids comprising means for setting up independent mechanical vibrations in the fluid adapted to be propagated along the path of travel of the fluid and in opposite directions and of the same wave length, said means being adjustable to vary the frequencies to equalize the wave lengths of said vibrations, and means for measuring at the same locality within the fluid the difference in frequencies of said vibrations.

22. A device for measuring the rate of flow of fluids comprising means for setting up independent mechanical vibrations in the fluid adapted to be propagated along the path of travel of the fluid and in opposite directions, said means being adjustable to vary the frequencies to equalize the wave lengths of said vibrations, means for measuring the difference in frequencies of said vibrations at localities in the fluid where the rate of flow thereof is equal, and means for momentarily actuating said measuring means.

23. A device for measuring the rate of flow of fluids comprising means for setting up independent mechanical vibrations in the fluid adapted to be propagated along the path of travel of the fluid and in opposite directions, said means being adjustable to vary the frequencies to equalize the wave lengths of said vibrations, means for detecting equalization of said wave lengths, means for measuring the difference in frequencies of said vibrations at localities where the rate of flow of the fluid is equal, and means for momentarily actuating said measuring and detecting means.

24. A device for measuring the rate of flow of fluids comprising means for setting up independent mechanical vibrations in the fluid adapted to be propagated along the path of travel of the fluid and in opposite directions, said means being adjustable to vary the frequencies to equalize the wave lengths of said vibrations, means for comparing the wave lengths of both sets of vibrations, said vibration producing means being operable to alternately set up said vibrations, and means for measuring the difference in frequencies of said vibrations at localities where the rate of flow of the fluid is equal.

In testimony whereof we affix our signatures.

HENRY E. HARTIG.
HUGH B. WILCOX.